Jan. 20, 1970          H. OGUEY          3,491,257

RESONANCE MOTOR FOR PORTABLE TIMEKEEPERS

Filed May 10, 1968          3 Sheets-Sheet 1

INVENTOR

HENRI OGUEY

By Stevens, Davis, Miller & Mosher

ATTORNEYS

Jan. 20, 1970  H. OGUEY  3,491,257
RESONANCE MOTOR FOR PORTABLE TIMEKEEPERS
Filed May 10, 1968  3 Sheets-Sheet 2

INVENTOR
HENRI OGUEY

By  *Stevens Davis Miller & Mosher*

ATTORNEYS

Jan. 20, 1970  H. OGUEY  3,491,257
RESONANCE MOTOR FOR PORTABLE TIMEKEEPERS
Filed May 10, 1968  3 Sheets-Sheet 3

INVENTOR
HENRI OGUEY
By
ATTORNEYS

United States Patent Office 3,491,257
Patented Jan. 20, 1970

3,491,257
RESONANCE MOTOR FOR PORTABLE TIMEKEEPERS
Henri Oguey, Peseux, Switzerland, assignor to Centre Electronique Horloger S.A., Neuchatel, Switzerland, a Swiss company
Filed May 10, 1968, Ser. No. 728,170
Claims priority, application Switzerland, May 12, 1967, 6,810/67
Int. Cl. H02k 7/06
U.S. Cl. 310—21        10 Claims

ABSTRACT OF THE DISCLOSURE

A resonance motor for portable timekeepers. The motor is particularly insensitive to accelerations and shocks, this feature being realized by carefully balancing the motor components, making the resonator strip relatively small and positioning the pawl driving strip parallel to the resonator strip.

---

The present invention concerns a resonance motor for portable timekeepers, comprising an electro-mechanical conversion member, a resonance member and a transformer of an oscillating motion into a unidirectional motion, the resonance member comprising a resilient mounting of high rigidity in a direction perpendicular to the axis of oscillation proper, the motion transformer comprising a pawl secured to the resonance member and cooperating with a ratchet wheel.

The purpose of the invention is to make the motor insensitive to accelerations and shocks.

The motor according to the invention is characterized in that the resonance member comprises at least two masses spaced from one another in the said direction of high rigidity and in that the blade of the pawl is mounted on the resonance member in such a fashion that it is not sensibly displaced longitudinally by an acceleration acting in a direction perpendicular to the direction of high rigidity and to the axis of oscillation.

The drawing illustrates, by way of examples, several embodiments of the motor according to the invention.

FIGURES 1 and 2 illustrate a synchronous motor in particular for a wrist watch. It comprises a resonator and a transformer, destined to convert the oscillating motion of the resonator into a step-by-step rotary motion, mounted on a platen 1.

Figure 1:
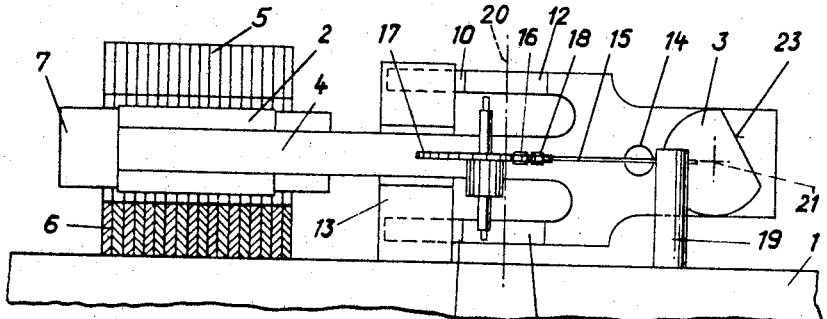
FIGURE 1 is a view in elevation, partially in cross-section, of a first embodiment.

The resonator comprises two masses 2 and 3 connected by an arm 4 of great rigidity. The mass 2 is active in the sense that it is constituted by a magnet in the shape of a parallelipiped, magnetized perpendicularly to the platen, moving in a direction parallel to the latter in the air gap 5 of an electromagnet 6 excited by two coils 7 and 8.

The mass 3 acts as a counter-weight. The mounting also comprises two lateral arms 9 and 10 having parts of reduced thickness 11 and 12 which are resilient. The free ends of the arms are held in a part 13 secured to the platen 1 of the watch. On the arm 4 is secured in addition a pin 14 from which extends a very thin spring strip 15 supporting a pawl jewel 16. This driving pawl 16 drives a ratchet wheel 17 having a large number of teeth. A retaining pawl 18 held by a fixed pin 19 prevents the wheel 17 from turning backwards.

Figure 2:
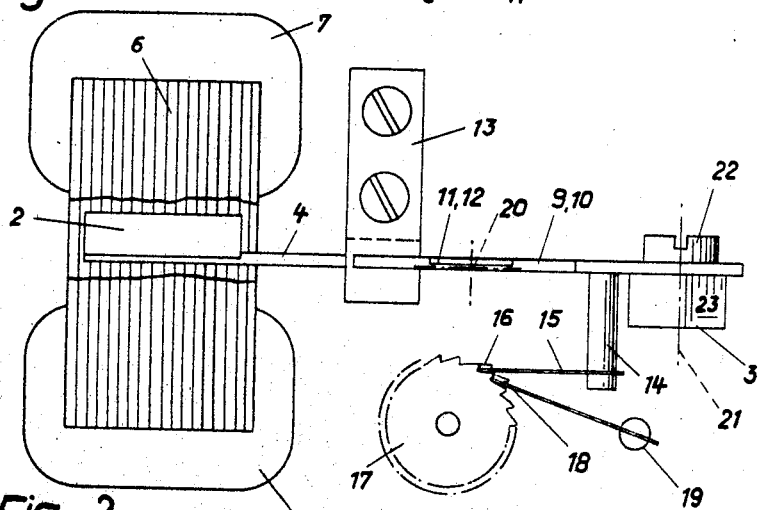
FIGURE 2 is a plan view, with a part torn away, of this embodiment.

The motor operates as follows:

Under the effect of a torque applied to their mobile end, the parts of reduced thickness 11 and 12 are bent to the shape of an arc of a circle, this deformation being equivalent, for small angles, to a rotation around an axis 20. The construction of the device is such that the centre of gravity of the masses 2 and 3 and of the mounting 4 is situated in the neighbourhood of the axis 20 in order to achieve equilibrium. The result of this equilibrium is that the normal oscillating motion is effected around the axis 20. On the other hand the deformation of the resilient parts 11 and 12 resulting from an acceleration is different from the deformation due to the normal motion of the motor. An acceleration perpendicular to the plane of the parts 11 and 12 produces a deformation in the shape of an S of these parts, for which the two masses move without rotation in directions parallel to one another. The rigidity of the parts of reduced thickness 11 and 12 which opposes such a deformation is the greater as they are shorter, which gives the watch a good resistance against shocks. In addition, as shown in FIGURE 2, the strip 15 of the driving pawl 16 is parallel to the parts of reduced thickness 11 and 12, that is perpendicular to the direction of lesser rigidity of the resilient mounting. Consequently, an acceleration in this direction of lesser rigidity does not alter the distance between the retaining pawl 18 and the driving pawl 16. A shock or an acceleration parallel to the strip 15 of the pawl, that is in the direction capable of producing a counting error, produces a practically negligible deformation of the resilient mounting, owing to the fact that the parts 11 and 12 are very rigid in this direction (traction or compression stress).

The adjustment of the natural frequency is effected by a rotation of the counterweight 3 around its securing axis 21 after loosening the screw 22. The effect of the flat 23 is to position the centre of gravity of the mass eccentrically in relation to the securing axis 21.

The adjustment modifies the moment of inertia of the mobile equipment whilst having only a negligible effect on its equilibrium.

Figure 3:
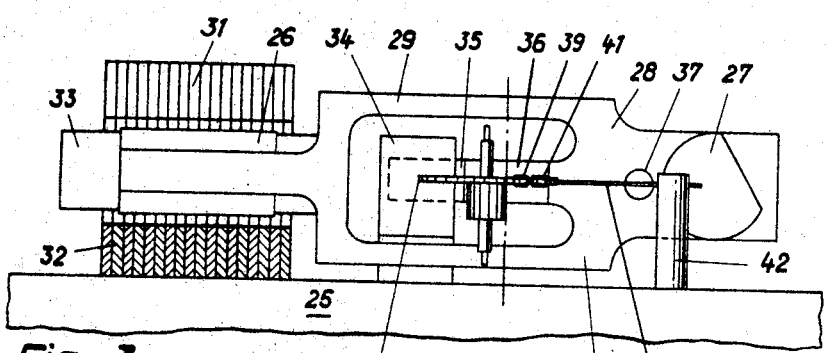
FIGURE 3 is a view corresponding to that of FIGURE 1, of a second embodiment.

FIGURE 3 is a view, corresponding to that of FIGURE 1, of a second embodiment. This embodiment differs from the first embodiment solely by the fact that the resilient mounting has two rigid connecting arms instead of only one and a single resilient arm instead of two.

The motor illustrated in FIGURE 3 comprises a platen 25, a resonator comprising two masses 26 and 27 connected by a strip 28 forming two arms of great rigidity 29 and 30. The active mass 26 moves in the air gap 31 of an electromagnet 32 excited by two coils of which only one 33 is shown. The mounting strip also has a median arm 35 the part of reduced thickness 36 of which is resilient. The free end of this arm is held in a part 34 secured to the platen 25. A spring strip 38 extending from a pin 37 secured to the strip 28 carries a pawl jewel 39. This pawl 39 drives a ratchet wheel 40 cooperating with a retaining pawl 41 carried by a fixed pin 42. The operation of the motor is identical with that of FIGURES 1 and 2.

Figure 4:
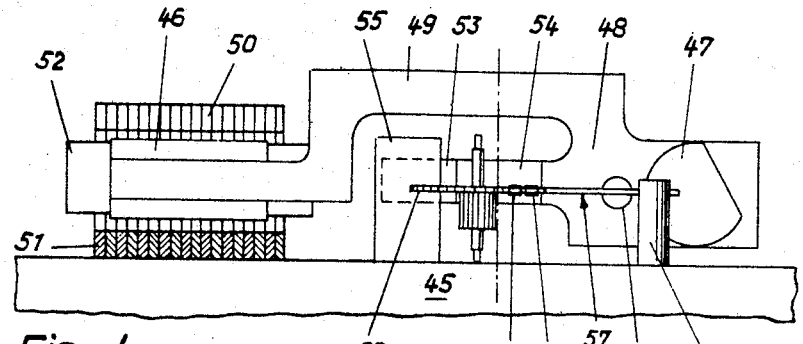
FIGURE 4 is a view corresponding to that of FIGURE 1 of a third embodiment.

FIGURE 4 is a view, corresponding to that of FIG-

URE 3, of a third embodiment. It differs from the second embodiment solely by the fact that the mounting strip has only one connecting arm between the masses instead of two. The motor illustrated in FIGURE 4 comprises a platen 45, a resonator comprising two masses 46 and 47 connected by a strip 48 having an arm 49 of great rigidity. The active mass 46 moves in the air gap 50 of an electromagnet 51 excited by two coils only one of which 52 is shown. The mounting strip 48 also has a median arm 53 the part of reducing thickness 54 of which is resilient. The free end of this arm is held in a part 55 secured to the platen 45. A spring strip 57 extending from a pin 56 secured to the strip 48 carries a pawl jewel 58. This pawl 58 drives a ratchet wheel 59 cooperating with a retaining pawl 60 held by a fixed pin 61. The operation of this motor is identical with that of FIGURES 1 and 2.

Figure 5:
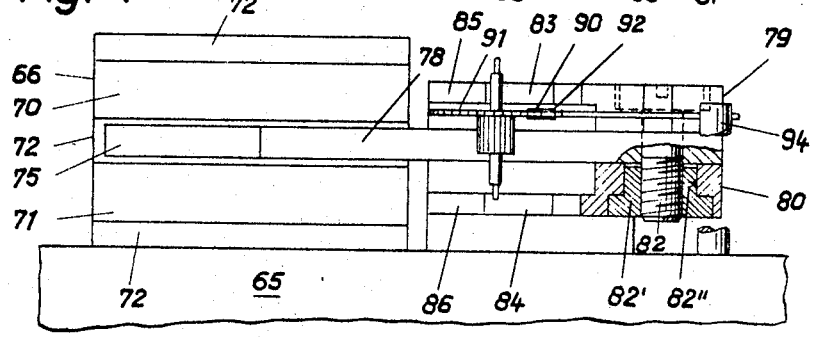
FIGURE 5 is a view in elevation, partially in cross-section, of a fourth embodiment.
Figure 6:
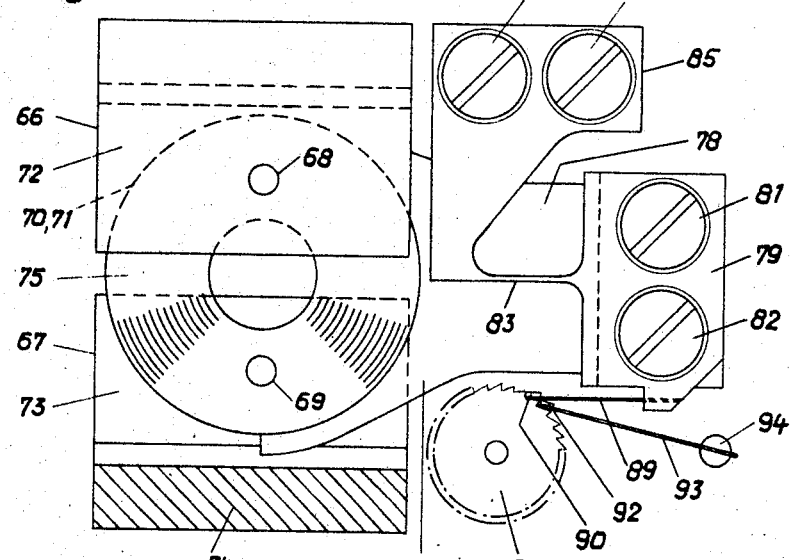
FIGURE 6 is a plan view, partly in cross-section, of this fourth embodiment.

FIGURES 5 and 6 respectively show a vertical cross-section and a plan view, partly in cross-section of a fourth embodiment, constituting an electrodynamic motor. It comprises a platen 65 on which are mounted two magnets 66, 67 generating two magnetic fields perpendicular to the platen 65 and of opposite directions. The magnet 66 comprises two magnetized pole pieces 70, 71 made of a material of high magnetic energy, mounted on the ends of a U-shaped part 72 made of soft iron. In the same way, the magnet 67 comprises two magnetized pole pieces, of which only one 73 is shown, mounted on the ends of a U-shaped part 74. A flat coil 75, disposed in the two air gaps formed between the two pairs of pole pieces is mounted on an insulating support 78, clamped between two mounting parts 79, 80, which also serve to bring the current to the coil 75 and as a counterweight for balancing. The support 78 is clamped between the two mounting parts 79, 80 by means of screws 81, 82. The insulation between the two mounting parts 79, 80 is achieved by means of insulating members of which only one 82' is visible, these members being lodged in corresponding cavities, of which only one 82" is shown, of the lower mounting part 80. The mounting parts 79, 80 are each provided with a resilient arm 83, 84 ending in a securing lug 85, 86. These two lugs 85, 86 are secured in an insulated fashion, to the platen 65 by means of two screws 87, 88. The upper mounting piece 79 carries a strip 89 to which is secured a pawl jewel 90 cooperating with a ratchet wheel 91. A retaining pawl jewel 92 is mounted on one end of a strip 93 the other end of which is secured to a pin 94. The operation of this embodiment is the same as that of the preceding embodiments, the difference residing in the electrodynamic drive by means of the coil 75.

Figure 7:
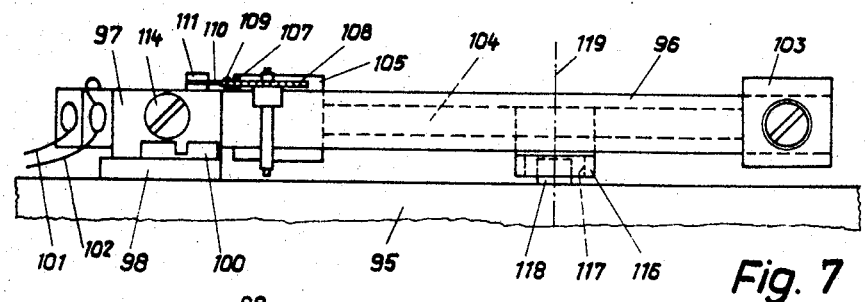
FIGURE 7 is a view in elevation of a fifth embodiment, in which the motor is of a piezoelectric nature.
Figure 8:
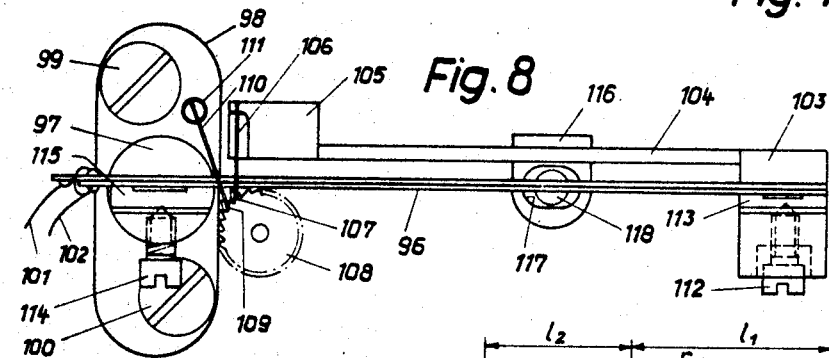
FIGURE 8 is a plan view of this fifth embodiment.
Figure 9:
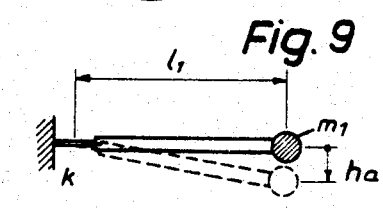
FIGURES 9 to 13 are schematic views for the explanation of the theory of the motor.

FIGURES 7 and 8 illustrate, in elevation, respectively in a plan view, a fifth embodiment constituted by a piezoelectric motor. In such a motor, the transformation of electric energy into mechanical energy is effected by means of a compound strip of piezoelectric material. In order to obtain a motion of sufficient amplitude, it is necessary to use a long compound strip.

The illustrated motor comprises a platen 95 on which is mounted a compound strip 96 of piezoelectric material which is polarized. To this end one of the ends of the compound strip 96 is held in a support 97 provided with a flange 98, secured to the platen 95 by means of two screws 99 and 100. The compound strip 96 is fed at this end by two conducting leads 101 and 102. To the other end is secured a mass 103 connected by an arm 104 to a counterweight 105. This counterweight 105 carries a strip 106 to the free end of which is secured a pawl jewel 107 cooperating with a ratchet wheel 108.

A jewel 109, forming a retaining pawl, is secured to the end of a strip 110 the other end of which is secured to a pin 111, mounted on the flange 98 of the support 97, by means of an adjusting member which is not shown. The mass 103 is mounted on the compound strip 96 by means of a screw 112, the inner end of which is applied against a clamping piece 113 acting on one face of the compound strip 96. The other end of the compound strip is mounted in the same fashion in the support 97, that is by means of a screw 114, the inner end of which is applied against a clamping piece 115 acting on the same face of the compound strip 96. The motor is provided in addition with a shock limiting device constituted by a part 116, secured to the arm 104 and provided with an elongated hole 117, in which is engaged a pin 118 driven into the platen 95.

The operation of this embodiment is as follows: the normal oscillating motion takes place around an axis 119 coinciding with the axis of the pin 118. The width of the hole 117 of the part 116 is very slightly larger than the diameter of the pin 118 in order to avoid all contacts. The pawl 107, placed at a certain distance from the axis 119, has an amplitude which is sufficient to drive the ratchet wheel 108. If an acceleration or a shock perpendicular to the plane of the compound strip occurs, the assembly of the two masses 103, 105 rotates around an axis, called the axis of insensibility to accelerations, which passes very near to the driving pawl 107. This pawl is therefore only subjected by the shock to a very small displacement. The deformation of the compound strip under the influence of a shock is limited by the part 116 coming into contact with the pin 118, which prevents a counting error or an excessive stress in the compound strip.

In the embodiments described with reference to the FIGURES 1 to 6, the insensibility to shocks was obtained by combining the following properties: (a) balancing of parts, (b) short resilient part of the resonator strip, (c) strip of the driving pawl parallel to the resonator strip.

In the embodiment described with reference to the FIGURES 7 and 8, the condition of equilibrium is not satisfied, but the strip of the driving pawl not only passes through the axis of insensibility to accelerations, but the point of contact between the pawl and the ratchet wheel is very near this axis.

FIGURES 9 to 13 illustrate the theory of the motor.

(a) Simple vibrating strip

Consider to begin with a simple vibrating strip with a punctual mass $m_1$ (FIGURE 9) and a short resilient part having a return force constant $k$ (torque per unit of angular displacement). The mass has an own sinusoidal motion around a point situated sensibly in the middle of the resilient part, at a distance $l_1$ from the mass. Its own pulse $\omega_1$ is given by $$\omega_1^2 = k/J = k/m_1 l_1^2 \qquad (1)$$

where $J$ is the moment of inertia of the mass in relation to the centre of rotation.

If the support is subjected to an acceleration $a$ in the downward direction, the mean position of the mass in relation to the support is deviated in the upward direction by a length $h_a$ $$h_a = m_1 l_1^2 a / k \qquad (2)$$

Introducing the pulse into this equation one finds:

$$h_a = a/\omega_1^2 \qquad (3)$$

This relation shows that there exists a correspondence between the own frequency of a resilient system and the deformation to which it is subjected under the influence of an acceleration. This relation is independent of the resilient mounting.

Now let A be the amplitude of the motion of the mass $m_1$, P the energy dissipated in the course of the motion and Q the quality factor of the system (including the pawl and ratchet). It is known that the following relation exists (see for instance: Max Hetzel "The Application of Electricity and Electronics to Wrist Watches" Horological Journal, March-July 1963, pp. 81–233)

$$A = \sqrt{\frac{2PQ}{m_1\omega_1^3}} \quad (4)$$

On the other hand, it is known that when the pawl and ratchet system is perfectly adjusted, the amplitude of the motion of the pawl is equal to the length of the teeth of the ratchet wheel, and the tolerable displacement of the mean position of the pawl is limited to half the length of the teeth. The condition which must be respected is therefore $$h_a < \frac{A}{2} \quad (5)$$

Taking into account the Equations 3 and 4, this condition becomes:

$$A < \sqrt{\frac{PQ\omega_1}{2m_1}} \quad (6)$$

The acceleration which can be tolerated, in the case of a tuning fork watch, may be deduced from the following data: $P=4.5$ μw., $Q=1640$, $\omega 2\pi \cdot 360$ Hz., $m_1=0.565$ gr. Therefore:

$$a < 121 \text{ m./sec.}^2 = 12.4 \text{ g}.$$

where $g$ is the acceleration of the earth.

Several known types of motors had the following values: $P=4$ μw., $Q=200$, $\omega=2\pi \cdot 300$ Hz., $m_1=0.04$ gr. Therefore:

$$a < 134 \text{ m./sec.}^2 = 13.7 \text{ g}.$$

The accelerations which can be tolerated found here are generally higher than those resulting from the movements of the wrist. But certain activities produce peak accelerations the value of which is considerably higher. Formula 6 shows that the counting security can be improved either by increasing the consumption, the quality factor or the counting frequency, or by reducing the vibrating mass. But other considerations prevent these values from being greatly modified, and owing to the fact that they appear under a root, the improvement in security which is possible is small.

(b) Balanced extended mass system

Figure 10:
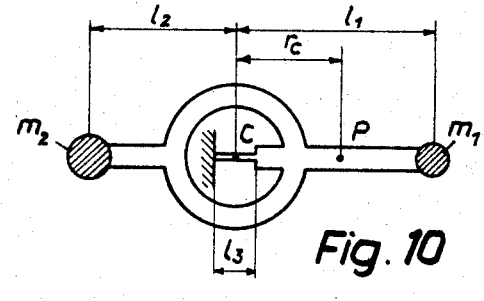
Figure 11:
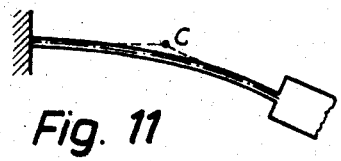
Figure 12:

Let us now consider the system shown in FIGURE 10 and corresponding to the first four embodiments. Here the mass $m_1$ is balanced by a mass $m_2$ connected to $m_1$ and situated on the opposite side of the strip. Equilibrium is established when the following conditions are satisfied:

(1) The centre C is on the straight line joining the centres of gravity of the masses $m_1$ and $m_2$.

(2) The distances $l_1$ between the mass $m_1$ and the centre C of the strip and $l_2$ between the mass $m_2$ and C are such that $$m_1 l_1 = m_2 l_2 \quad (7)$$

In other words equilibrium is established when the centre of gravity of the mobile equipment is situated on the axis of rotation defined by the resilient mounting.

In a perfect state of equilibrium, the strip is bent in the shape of an arc of a circle when the mobile equipment oscillates, the own pulse $\omega_1$ of this motion being given by $$\omega_1^2 = k/J = k/(m_1 l_1^2 + m_2 l_2^2) \quad (8)$$

$$\omega_1^2 = \frac{k}{m_1 l_1 (l_1 + l_2)} \quad (9)$$

The effect of an acceleration perpendicular to the plane of the strip is to cause the latter to be deformed in a different manner. If equilibrium is perfect, the strip takes the shape of an S (FIGURE 12) the ends of which have parallel tangents. The mobile equipment is displaced, remaining parallel to itself, by a quantity $$h_a = (m_1 + m_2) l_3^2 a / 12k \quad (10)$$

It is advantageous to express this displacement in function of the own pulse $\omega_d$ associated with the direction in which the acceleration occurs $$h_a = a/\omega_d^2 \quad (11)$$

The direction perpendicular to the plane of the strip is associated with a pulse $\omega_2$ the value of which is $$\omega_2/\omega_1 = 3.464 r_g/l_3 \quad (12)$$

where $r_g$ is the radius of gyration defined by:

$$r_g^2 = J/m = J/(m_1 + m_2) \quad (13)$$

where $m$ is the total mass of the mobile equipment.

If the pawl is situated in the plane of the strip with its spring perpendicular to the plane of the strip, it moves in the same direction whether the system oscillates or is subjected to an acceleration perpendicular to the strip. But in this second case the higher rigidity of the strip leads to a higher tolerable acceleration for the balanced system.

Here, the amplitude is given by the following expression, which replaces (4)

$$A = \frac{r_c}{r_g} \sqrt{\frac{2PQ}{m\omega_1^3}} \quad (4')$$

where $r_c$ is the distance between the pawl and the centre of rotation. In FIGURE 10 the pawl is supposed to be in the point P. The combination of the relations (4'), (5) and (11) gives $$a < \frac{r_c \omega_d^2}{r_g \omega_1^2} \sqrt{\frac{PQ\omega_1}{2m}} \quad (14)$$

A considerable increase of the tolerable acceleration may be obtained by arranging to have $\omega_d \gg \omega_1$. In the case considered here, $\omega_d = \omega_2$ and $\omega_2$ is defined by (12). Therefore $$a < \frac{12 r_g r_c}{l_3^2} \sqrt{\frac{PQ\omega_1}{2m}} \quad (15)$$

If the strip is short in relation to the radius of gyration, the improvement is considerable. For instance $P=4$ μw., $Q=200$, $\omega=2\pi \cdot 300$ Hz, $m=2m_1=0.08$ gr., $r_g=4.5$ mm., $l_3=1.8$ mm., $r_c=1.8$ mm.

$$a < 2910 \text{ m./sec.}^2 = 296 g$$

The improvement attains here a factor of 24, compared to the case (a).

In the four first embodiments, the spring of the pawl is parallel to the mounting strips. Consequently, an acceleration perpendicular to the plane of the strips does not modify the phase of the pawls, but merely produces a small variation of the tension of the spring. Only an acceleration in the longitudinal direction of the spring would be capable of producing an error in phase. The own pulse $\omega_3$ associated with this deformation is given by $$\omega_3/\omega_1 = 3,464 r_g/e$$

where $e$ is the thickness of the strip. Taking $\omega_3 = \omega_d$, Equation 14 indicates that the tolerable acceleration is given by $$a \frac{12 r_g r_c}{e^2} \sqrt{\frac{PQ\omega_1}{2m}} \quad (16)$$

If, for instance, $r=4.5$ mm., $e=0.1$ mm., the factor which multiplies the root has a value of 7800. This factor is so large that a longitudinal shock is practically incapable of causing a counting error.

(c) Unbalanced extended mass system

Figure 13:
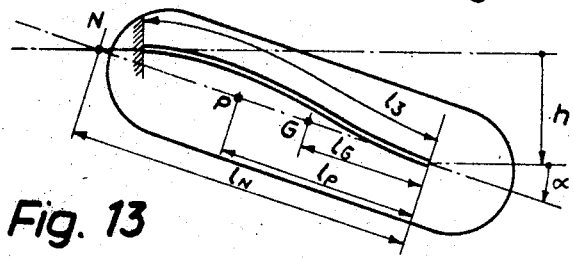

FIGURE 13 illustrates, in a very exaggerated fashion, the position of the system comprising an extended mass $m$ and $a$ strip, when an upward acceleration of the securing point occurs.

Displacement of the end of the strip $$h = \frac{m a l_g^2}{E J_s} (L_3/3 - L_g/2) \quad (17)$$

where:
E=modulus of elasticity of the strip
$J_s$=moment of inertia of the cross-section of the strip (constant).
Rotation of the end of the strip $$\gamma = \frac{mal_3}{EJ_s}(l_3/2 - l_g) \quad (18)$$

Vertical displacement of any point P on the principal axis of inertia $$h_p = h - l_p \cdot \gamma \quad (19)$$

A point N exists which remains immovable in relation to the support (case of the fifth embodiment). Its distance from the end of the strip is given by the condition $hp=0$. Equation 19 gives $$l_n = h/\gamma \quad (20)$$

$$l_n = l_3 \frac{2l_3 - 3l_g}{3l_3 - 6l_g} \quad (21)$$

The condition of equilibrium is expressed by $l_g = l_3/2$. It is seen that in that case $l_n = \infty$. In the case of equilibrium, the axis of insensibility to accelerations is removed to the infinite.

The axis N may be made to pass through the point where the oscillating motion has the amplitude which is necessary for the pawl. If, for instance, the axis N must be situated at the point where the strip is secured, then $l_n = l_3$, $l_g = l_3/3$.

I claim:

1. A resonance motor for portable timekeepers, comprising an electro-mechanical conversion member, a resonance member and a transformer of an oscillating motion into a unidirectional motion, the resonance member comprising a resilient mounting of high rigidity in a direction perpendicular to the axis of oscillation proper, the motion transformer comprising a pawl secured to the resonance member and cooperating with a ratchet wheel, characterized in that the resonance member comprises at least two masses spaced from one another in the said direction of high rigidity and in that the blade of the pawl is mounted on the resonance member in such a fashion that it is not sensibly displaced longitudinally by an acceleration acting in a direction perpendicular to the direction of high rigidity and to the axis of oscillation.

2. A motor according to claim 1, characterized in that the oscillating member comprises at least one rigid arm, to each end of which a mass is attached, as well as at least one resilient arm, parallel to the rigid arm and secured at one end to this rigid arm, and at the other end to a mounting part of the resonance member, this resilient arm determining an axis of oscillation located at least approximately on the centre of gravity of the said two masses, the blade of the pawl being parallel to the said two arms, the common direction of the said arms and of the said pawl blade constituting the said direction of high rigidity.

3. A motor according to claim 2, characterized in that one of the said masses forms part of the said electro-mechanical conversion member and is constituted by a magnet cooperating with an electromagnet.

4. A motor according to claim 2, characterized in that one of the said masses forms part of the said electro-mechanical conversion member and is constituted by a coil cooperating with a magnet.

5. A motor according to claim 1, characterized in that the centre of gravity of one of the masses can be displaced radially in order to vary the frequency proper of the resonance member.

6. A motor according to claim 3, characterized in that it comprises two resilient arms between which is disposed a rigid arm.

7. A motor according to claim 3, characterized in that it comprises two rigid arms between which is disposed a resilient arm.

8. A motor according to claim 3, characterized in that the resonant member comprises a single rigid arm at each end of which is disposed one of the two masses, a central part of the said arm being staggered in the lateral direction in relation to the axis passing through the two masses, in such a fashion as to form a space in which a single resilient arm extends along the said axis.

9. A motor according to claim 1, characterized in that the resonance member comprises a compound piezo-electric strip, motor, securing end of which is immovable in relation to the ratchet wheel, the other end being secured to a mass and to one end of an arm the other end of which carries the second mass and the pawl, the arm and the compound strip being parallel to one another, the blade of the pawl being transversal to the compound strip and the pawl being situated in the neighbourhood of the securing end of the compound strip.

10. A motor according to claim 9, characterized in that the compound strip cooperates with a device which limits the displacement of the axis of oscillation when an acceleration in a direction perpendicular to the plane of the compound strip occurs.

References Cited

UNITED STATES PATENTS

| | | | |
|---|---|---|---|
| 3,127,529 | 3/1964 | Barrett | 310—21 |
| 3,204,133 | 8/1965 | Tschudin | 310—22 |
| 3,286,453 | 11/1966 | Baehni | 310—26 X |
| 3,360,704 | 12/1967 | Kohlhagen | 310—21 X |
| 3,369,135 | 2/1968 | Hotine | 310—21 |

FOREIGN PATENTS 1,254,089  11/1967  Germany.

MILTON O. HIRSHFIELD, Primary Examiner

D. F. DUGGAN, Assistant Examiner

U.S. Cl. X.R.

58—116; 310—8.1, 8.5, 25